(12) United States Patent
Liu et al.

(10) Patent No.: US 11,743,768 B2
(45) Date of Patent: Aug. 29, 2023

(54) LONG-RANGE TRANSMISSION AND RECEPTION FOR LOW-POWER INDOOR APPLICATIONS IN 6-GHZ BAND

(71) Applicant: MediaTek Singapore Pte. Ltd., Singapore (SG)

(72) Inventors: Jianhan Liu, San Jose, CA (US); Shengquan Hu, San Jose, CA (US); Hsuan-Yu Liu, Hsinchu (TW); Thomas Edward Pare, Jr., San Jose, CA (US); Yungping Hsu, Hsinchu (TW)

(73) Assignee: MediaTek Singapore Pte. Ltd., Singapore (SG)

( * ) Notice: Subject to any disclaimer, the term of this patent is extended or adjusted under 35 U.S.C. 154(b) by 0 days.

(21) Appl. No.: 17/334,463

(22) Filed: May 28, 2021

(65) Prior Publication Data

US 2021/0385688 A1  Dec. 9, 2021

Related U.S. Application Data

(60) Provisional application No. 63/035,867, filed on Jun. 8, 2020.

(51) Int. Cl.
*H04W 76/10* (2018.01)
*H04W 28/06* (2009.01)

(52) U.S. Cl.
CPC ......... *H04W 28/065* (2013.01); *H04W 76/10* (2018.02)

(58) Field of Classification Search
CPC .... H04W 28/065; H04W 76/10; H04L 84/12; H04L 5/00; H04L 27/26; H04L 27/00
See application file for complete search history.

(56) References Cited

U.S. PATENT DOCUMENTS 8,989,762 B1 * 3/2015 Negus .................. H04W 24/08
455/454
10,873,947 B2 * 12/2020 Silverman ........... H04W 72/042
(Continued)

FOREIGN PATENT DOCUMENTS

WO    WO 2019240792 A1    12/2019

OTHER PUBLICATIONS

European Patent Office, Extended European Search Report regarding European Patent Application No. 21177902.0, dated Nov. 5, 2021.
(Continued)

*Primary Examiner* — Hassan A Phillips
*Assistant Examiner* — Prenell P Jones
(74) *Attorney, Agent, or Firm* — Han IP PLLC; Andy M. Han

(57) ABSTRACT

A wireless communication link is established between a first station (STA) and a second STA in a 6-GHz band. The first STA and the second STA the communicate in the 6-GHz band using a low-power indoor (LPI) long range (LR) physical-layer protocol data unit (PPDU). The LPI LR PPDU includes a legacy preamble, a universal signal field (U-SIG), an extreme-high-throughput signal field (EHT-SIG), an extreme-high-throughput short training field (EHT-STF), an extreme-high-throughput long training field (EHT-LTF), and a payload. Each of the legacy preamble, U-SIG and EHT-SIG is modulated and duplicated over multiple 20-MHz subchannels for a 80-MHz, 160-MHz or 320-MHz bandwidth over which the LPI LR PPDU is transmitted. Each of the EHT-STF, EHT-LTF and payload is modulated and transmitted on an entirety of the 80-MHz, 160-MHz or 320-MHz bandwidth.

17 Claims, 11 Drawing Sheets

(56) References Cited

U.S. PATENT DOCUMENTS

| | | | |
|---|---|---|---|
| 10,932,184 B2* | 2/2021 | Lou | H04L 5/0032 |
| 10,979,116 B2* | 4/2021 | Oteri | H04B 7/0695 |
| 2019/0097850 A1 | 3/2019 | Kenney et al. | |
| 2020/0014509 A1 | 1/2020 | Asterjadhi et al. | |
| 2020/0076552 A1* | 3/2020 | Cherian | H04L 5/0007 |
| 2020/0177425 A1 | 6/2020 | Chen et al. | |
| 2021/0037426 A1* | 2/2021 | Zhu | H04W 28/16 |
| 2021/0250125 A1* | 8/2021 | Park | H04L 27/2614 |
| 2021/0266098 A1* | 8/2021 | Cao | H04L 1/0069 |
| 2021/0385118 A1* | 12/2021 | Umehara | H04L 27/0012 |
| 2022/0061086 A1* | 2/2022 | Xue | H04L 5/0032 |
| 2022/0353125 A1* | 11/2022 | Park | H04L 27/2602 |

OTHER PUBLICATIONS

Evgeny Khorov et al., "Current Status and Directions of IEEE 802.11be, the Future Wi-Fi 7", IEEE Access, IEEE, USA, vol. 8, May 7, 2020, pp. 88664-88688, XP011789411.

Taiwan Intellectual Property Office, Office Action for Taiwan Patent Application No. 110119914, dated Jan. 12, 2022.

Jianhan Liu, "DCM for range extension in 6GHz LPI", IEEE May 28, 2020 20/0986rl, Mar. 2020 (https://mentor.ieee.org/802.11/dcn/20/11-20-0986-01-00be-dcm-for-range-extension-in-6ghz-lpi-band.pptx), pp. 4-5.

* cited by examiner

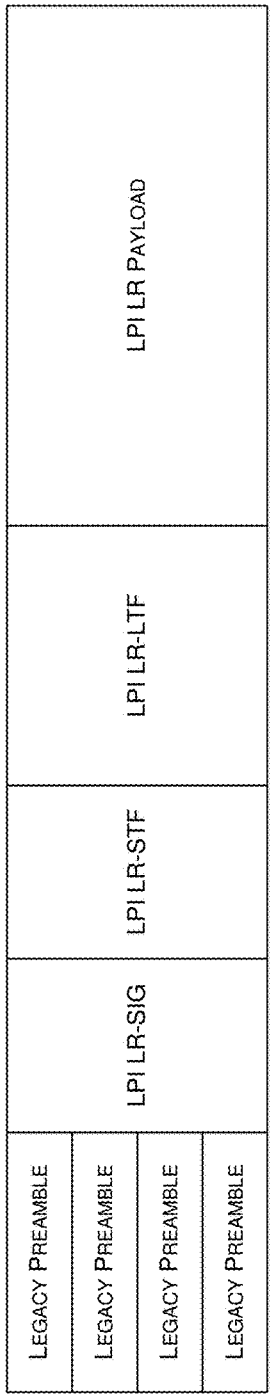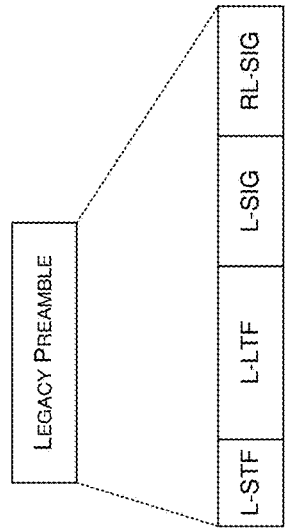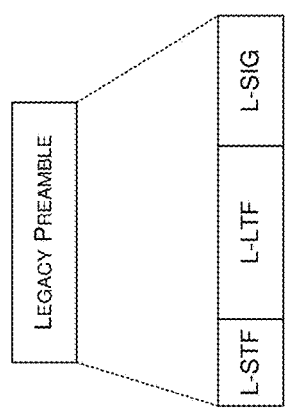
FIG. 2

| Scheduled RU | DTD FOR PROPORTIONAL TONE DISTRIBUTION MAPPING ONTO: (# OF TONES) | | | | |
|---|---|---|---|---|---|
| | 242 | 484 | 996 | 2x996 (OPTION 1) | 2x996 (OPTION 2) |
| RU26 | 8 | 16 | 32 | 32 | 64 |
| RU52 | 4 | 8 | 16 | 16 | 32 |
| RU106 | 2 | 4 | 8 | 8 | 16 |
| RU242 | 1 | 2 | 4 | 4 | 8 |

| LEGACY PREAMBLE | U-SIG | EHT-SIG | EHT-STF | EHT-LTF | EHT PAYLOAD |
| --- | --- | --- | --- | --- | --- |
| LEGACY PREAMBLE | U-SIG | EHT-SIG | EHT-STF | EHT-LTF | EHT PAYLOAD |
| LEGACY PREAMBLE | U-SIG | EHT-SIG | EHT-STF | EHT-LTF | EHT PAYLOAD |
| LEGACY PREAMBLE | U-SIG | EHT-SIG | EHT-STF | EHT-LTF | EHT PAYLOAD |

FIG. 6

LONG-RANGE TRANSMISSION AND RECEPTION FOR LOW-POWER INDOOR APPLICATIONS IN 6-GHZ BAND

CROSS REFERENCE TO RELATED PATENT APPLICATION

The present disclosure is part of a non-provisional patent application claiming the priority benefit of U.S. Provisional Patent Application No. 63/035,867, filed on 8 Jun. 2020, the content of which being incorporated by reference in its entirety.

TECHNICAL FIELD

The present disclosure is generally related to wireless communications and, more particularly, to long-range transmission and reception for low-power indoor applications in 6-GHz band in wireless local area networks (WLANs).

BACKGROUND

Unless otherwise indicated herein, approaches described in this section are not prior art to the claims listed below and are not admitted as prior art by inclusion in this section.

Under current regulations by the Federal Communications Commission (FCC) regarding wireless communications in the 2.4-GHz and 5-GHz bands, the equivalent isotropically radiated power (EIRP) of a power spectral density (PSD) limit is capped at 20 dBm for 2-MHz transmission and the transmission (Tx) power limit is capped at 30 dBm. With a reasonable Tx power assumption, the FCC requirement would not limit Tx power for narrow-bandwidth transmissions. However, the FCC requirement regarding 6-GHz low-power indoor (LPI) applications is far more stringent than PSD requirement regarding the 2.4-GHz and 5-GHz bands. For instance, the EIRP limit is at 5 dBm/MHz for an access point (AP) in 6-GHz LPI versus the EIRP limit of 17 dBm/MHz for APs in the 5-GHz band. Similarly, the EIRP limit is at −1 dBm/MHz for an AP in 6-GHz LPI versus the EIRP limit of 11 dBm/MHz for APs in the 5-GHz band. Moreover, the European Telecommunications Standards Institute (ETSI) limit on PSD is even more stringent than that of the FCC. The challenge for 6-GHz LPI is thus to achieve long-range transmission and reception while meeting the low-power requirements. Therefore, there is a need for a solution for long-range transmission and reception for low-power indoor applications in 6-GHz band in WLANs.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to long-range transmission and reception for low-power indoor applications in 6-GHz band in WLANs. Under various proposed schemes in accordance with the present disclosure, it is believed that aforementioned issue may be addressed.

In one aspect, a method may involve establishing a wireless communication link between a first station (STA) and a second STA in a 6-GHz band. The method may also involve communicating between the first STA and the second STA in the 6-GHz band using a LPI long range (LR) physical-layer protocol data unit (PPDU).

In another aspect, an apparatus may include a transceiver configured to communicate wirelessly and a processor coupled to the transceiver. The processor may establish, via the transceiver, a wireless communication link between a first STA and a second STA in a 6-GHz band. The processor may also communicate, via the transceiver, between the first STA and the second STA in the 6-GHz band using a LPI LR PPDU.

It is noteworthy that, although description provided herein may be in the context of certain radio access technologies, networks and network topologies such as, Wi-Fi, the proposed concepts, schemes and any variation(s)/derivative(s) thereof may be implemented in, for and by other types of radio access technologies, networks and network topologies such as, for example and without limitation, Bluetooth, ZigBee, $5^{th}$ Generation (5G)/New Radio (NR), Long-Term Evolution (LTE), LTE-Advanced, LTE-Advanced Pro, Internet-of-Things (IoT), Industrial IoT (IIoT) and narrowband IoT (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

FIG. 2 is a diagram of an example design in accordance with an implementation of the present disclosure.

FIG. 5 is a diagram of an example scenario in accordance with an implementation of the present disclosure.

FIG. 6 is a diagram of an example design in accordance with an implementation of the present disclosure.

DETAILED DESCRIPTION OF PREFERRED EMBODIMENTS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to long-range transmission and reception for low-power indoor applications in 6-GHz band in WLANs. According to the present disclosure, a number of possible solutions may be implemented separately or jointly. That is, although these possible solutions may be described below separately, two or more of these possible solutions may be implemented in one combination or another.

Figure 1:
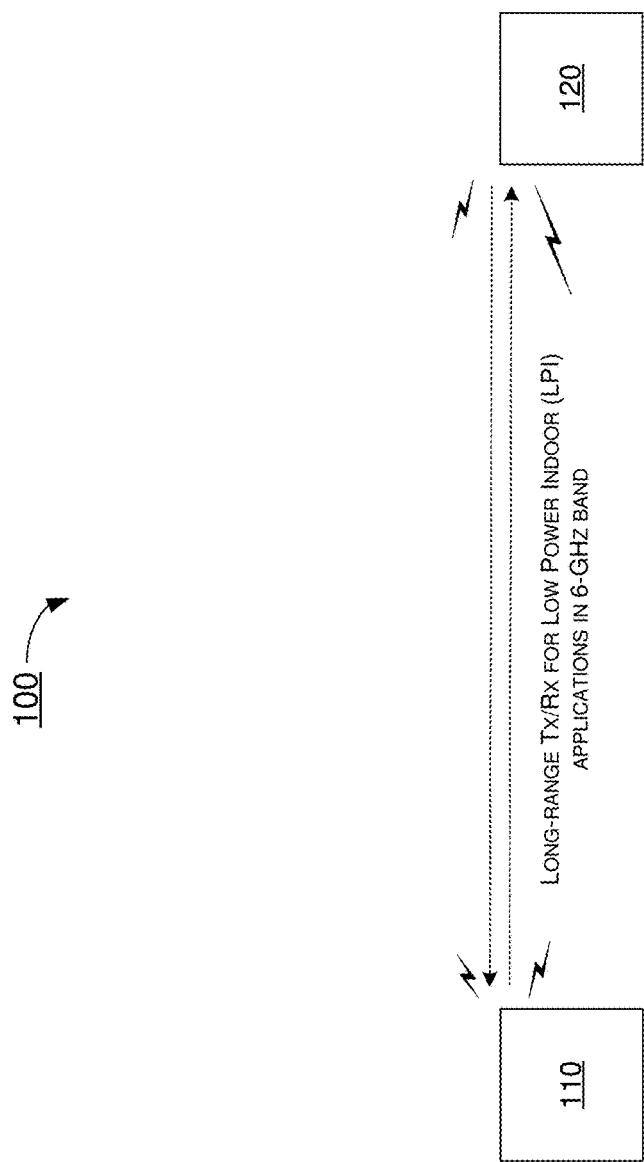
FIG. 1 is a diagram of an example network environment in which various solutions and schemes in accordance with the present disclosure may be implemented.

FIG. 1 illustrates an example network environment 100 in which various solutions and schemes in accordance with the present disclosure may be implemented. FIG. 2~FIG. 11 illustrate examples of implementation of various proposed schemes in network environment 100 in accordance with the present disclosure. The following description of various proposed schemes is provided with reference to FIG. 1~FIG. 11.

Referring to FIG. 1, network environment 100 may involve a communication entity 110 and a communication entity 120 communicating wirelessly (e.g., in a WLAN in accordance with one or more IEEE 802.11 standards). For instance, communication entity 110 may be a first STA and communication entity 120 may be a second STA, with each of the first STA and second STA being an access point (AP) or a non-AP STA. Under various proposed schemes in accordance with the present disclosure, communication entity 110 and communication entity 120 may be configured to perform long-range transmission and reception for low-power indoor applications in 6-GHz band, as described herein.

In general, at current time LPI tends to be more attractive than automated frequency coordination (AFC) even though LPI has more stringent regulations on PSD. This is because implementations of AFC would need a third-party to provide database, which is out of control of system and chip vendors. Television whitespace is an example. Also, although AFC may be useful in the future, LPI is currently available. Besides, even when AFC is ready, Unlicensed National Information Infrastructure (U-NII) 6 and 8 are only for LPI with a total of 350-MHz band. On the other hand, the PSD constraints on LPI can be overcome with design changes.

With respect to a comparison between 5-GHz LPI and 6-GHz LPI, there are some differences especially differences in range. For instance, in 5-GHz band, the range of uplink (UL) transmissions can be extended by using smaller-size resource units (RUs) for trigger-based physical-layer protocol data units (PPDUs). In 6-GHz band, however, the range of UL transmissions cannot be extended by using small RUs for trigger-based PPDUs. For example, the range of a beacon transmitted in the 6-GHz band using 20-MHz PPDUs is half of that of a 5-GHz beacon. In case a downlink (DL) trigger frame is transmitted using 20-MHz PPDUs, and in case it is desirable for a STA to achieve a similar range by using small-size RUs, the issue of PSD limit would need to be resolved.

In short, there are two range-related issues in 6-GHz LPI. A first issue is a general range issue of 6-GHz LPI. That is, 6-GHz LPI has a much shorter range compared to the 5-GHz band. For a 20-MHz beacon, 5+13=18 dBm in 6-GHz band compared to 17+13=30 dBm in 5-GHz band with a 12 dB difference. The range in 6-GHz band is a fourth of that in 5-GHz band and the coverage area of 6-GHz LPI is merely one sixteenth of that of 5-GHz band. Thus, a design of a new wide bandwidth (BW) LPI long-range (LR) PPDU is needed to address this issue. A second issue relates to the difference between UL transmission and DL transmission. That is, the difference is 5 dBm/MHz for DL versus −1 dBm/MHz for UL. Distributed-tone RU is introduced to address the issue of UL-DL range difference by using a wider BW (e.g., 20 MHz) for DL transmissions and a narrow BW (e.g., 2 MHz) for UL transmissions. That is, wide BW LPI LR PPDU may be used to transmit beacons and single-user (SU) PPDUs to extend the range, thereby enlarging the size of the respective basic service set (BSS).

FIG. 2 illustrates an example design 200 of a format of a LPI LR PPDU under a proposed scheme in accordance with the present disclosure. Under the proposed scheme, a LPI LR PPDU in 6-GHz LPI may be a 40-MHz, 80-MHz or 160-MHz PPDU. The proposed scheme also provides a new LPI LR preamble and long-range transmission scheme for payload. Referring to part (A) of FIG. 2, a LPI LR PPDU may include a number (e.g., 4, 8 or 16) of 20-MHz legacy preambles, at least one LPI long range signal field (LR-SIG), at least one LPI LR short training field (LPI LR-STF), at least one LPI LR long training field (LPI LR-LTF), and at least one LPI LR payload. Under the proposed scheme, for the new LPI LR preamble, a 20-MHz legacy preamble used in IEEE 802.11a/g/n/ac or IEEE 802.11ax may be duplicated in frequency domain. Referring to part (B) of FIG. 2, the 20-MHz legacy preamble tin the LPI LR PPDU may be the 20-MHz legacy preamble used in IEEE 802.11a/g/n/ac or IEEE 802.11ax which may be duplicated or otherwise repeated in the frequency domain. For instance, for a 80-MHz LPI LR preamble, the 20-MHz legacy preamble may be duplicated/repeated four times. Similarly, for a 160-MHz LPI LR preamble, the 20-MHz legacy preamble may be duplicated/repeated eight times. Likewise, for a 320-MHz LPI LR preamble, the 20-MHz legacy preamble may be duplicated/repeated sixteen times. As shown in part (B) of FIG. 2, the 20-MHz legacy preamble used in IEEE 802.11a/g/n/ac may include a legacy short training field (L-STF), legacy long training field (L-LTF) and a legacy signal field (L-SIG). Similarly, the 20-MHz legacy preamble used in IEEE 802.11ax may include a L-STF, L-LTF, a L-SIG and a repeated legacy signal field (RL-SIG). It is noteworthy that, although design 200 shows a 80-MHz LPI LR PPDU under the proposed scheme, the concept presented herein may be applicable to a 160-MHz or 320-MHz LPI LR PPDU.

Figure 3:
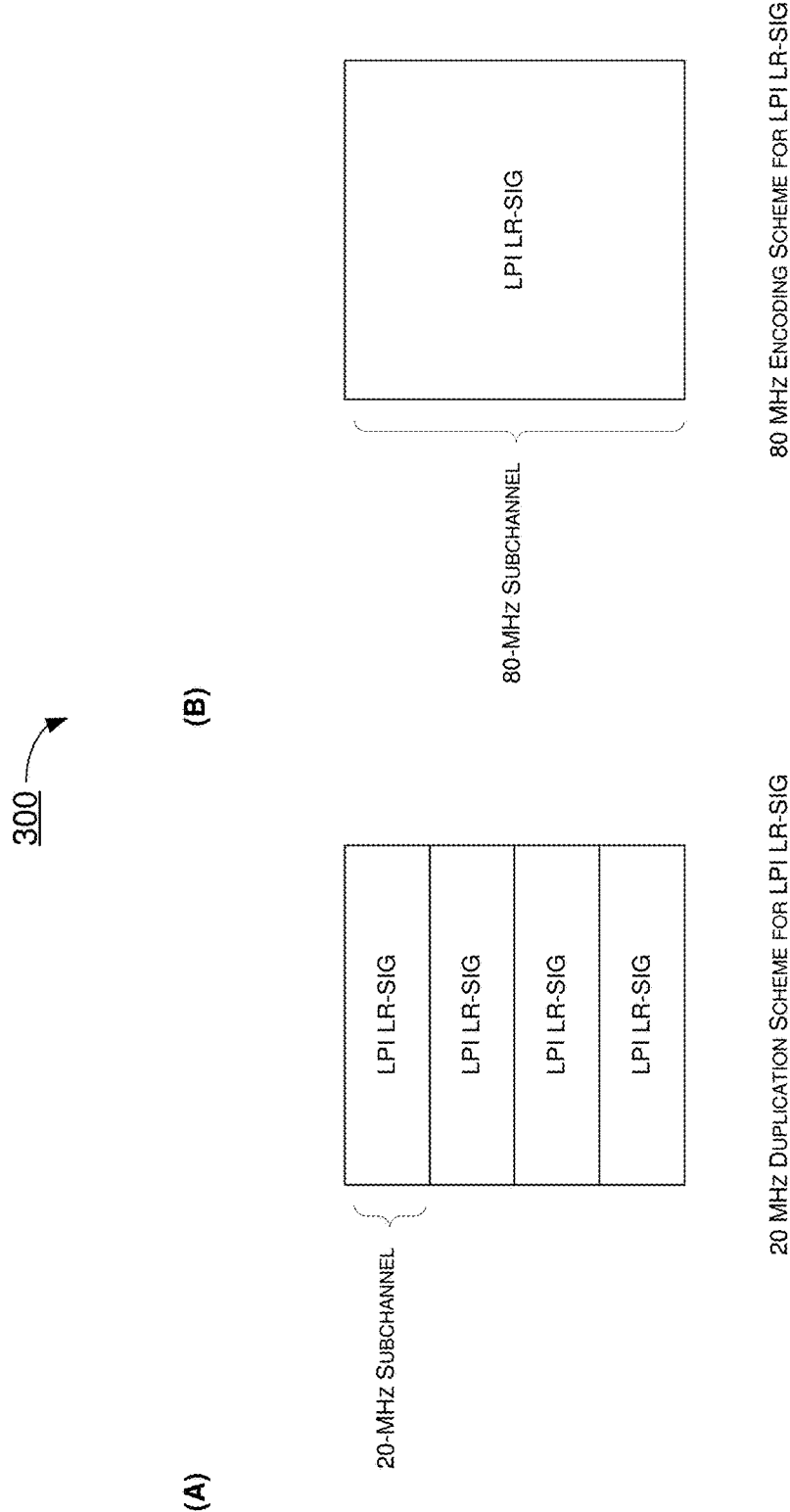
FIG. 3 is a diagram of an example design in accordance with an implementation of the present disclosure.

FIG. 3 illustrates an example design 300 of a LPI LR-SIG of a LPI LR PPDU under a proposed scheme in accordance with the present disclosure. Under the proposed scheme, the LR-SIG field may contain indications on modulation coding scheme (MCS), coding, LR PPDU format, and/or repetition factor to enable demodulation and decoding of the LPI LR payload. A length of the LPI LR-SIG field may be one orthogonal frequency-division multiplexing (OFDM) symbol or two OFDM symbols. Under the proposed scheme, the LPI LR-SIG field may be binary phase shift keying (BPSK) modulated and encoded over a 20-MHz subchannel and then duplicated or otherwise repeated in each 20-MHz subchannel in the frequency domain. Alternatively, or additionally, the LPI LR-SIG field may be BPSK modulated and encoded over a 40-MHz, 80-MHz, 160-MHz or 320-MHz band with information bits spread by a factor of 2, 4, 6 or 8. Alternatively, a subchannel containing the LPI LR-SIG may be repeated by 2, 4, 6 or 8 times. For illustrative purposes and without limitation the scope of the present disclosure, part (A) of FIG. 3 shows a 20-MHz LPI LR-SIG encoded, modulated over a 20-MHz subchannel and duplicated/repeated four times for transmission over a 80-MHz bandwidth. Part (B) of FIG. 3 shows a 80-MHz MHz LPI LR-SIG encoded, modulated and transmitted over a 80-MHz bandwidth. It is noteworthy that, although design 300 shows a 80-MHz LPI LR-SIG under the proposed scheme, the concept presented herein may be applicable to a 160-MHz or 320-MHz LPI LR-SIG.

Under a proposed scheme in accordance with the present disclosure with respect to LR payload, there may be two approaches to enabling LR payload transmission and reception. A first approach under the proposed scheme may involve two low-rate full-BW transmission schemes, namely a repetition scheme and a low-rate coding scheme. Under the repetition scheme, a modulated signal may be duplicated on several tones that are separated from each other. For instance, the signal may be encoded on 20 MHz and duplicated on 20 MHz in the frequency domain. Alternatively, the encoding may be done on a large BW and then the signal may be duplicated on different tones such as, for example, by dual carrier modulation (DCM) or duplicate DCM. Under the low-rate coding scheme, low-rate codes may be utilized. A second approach under the proposed scheme may involve usage of distributed tone RU (DT-RU). For instance, the tones in small-size RUs (e.g., RUs of less than 242 tones) may be distributed on larger-size RUs (e.g., RUs of 242 or more tones).

Figure 4:
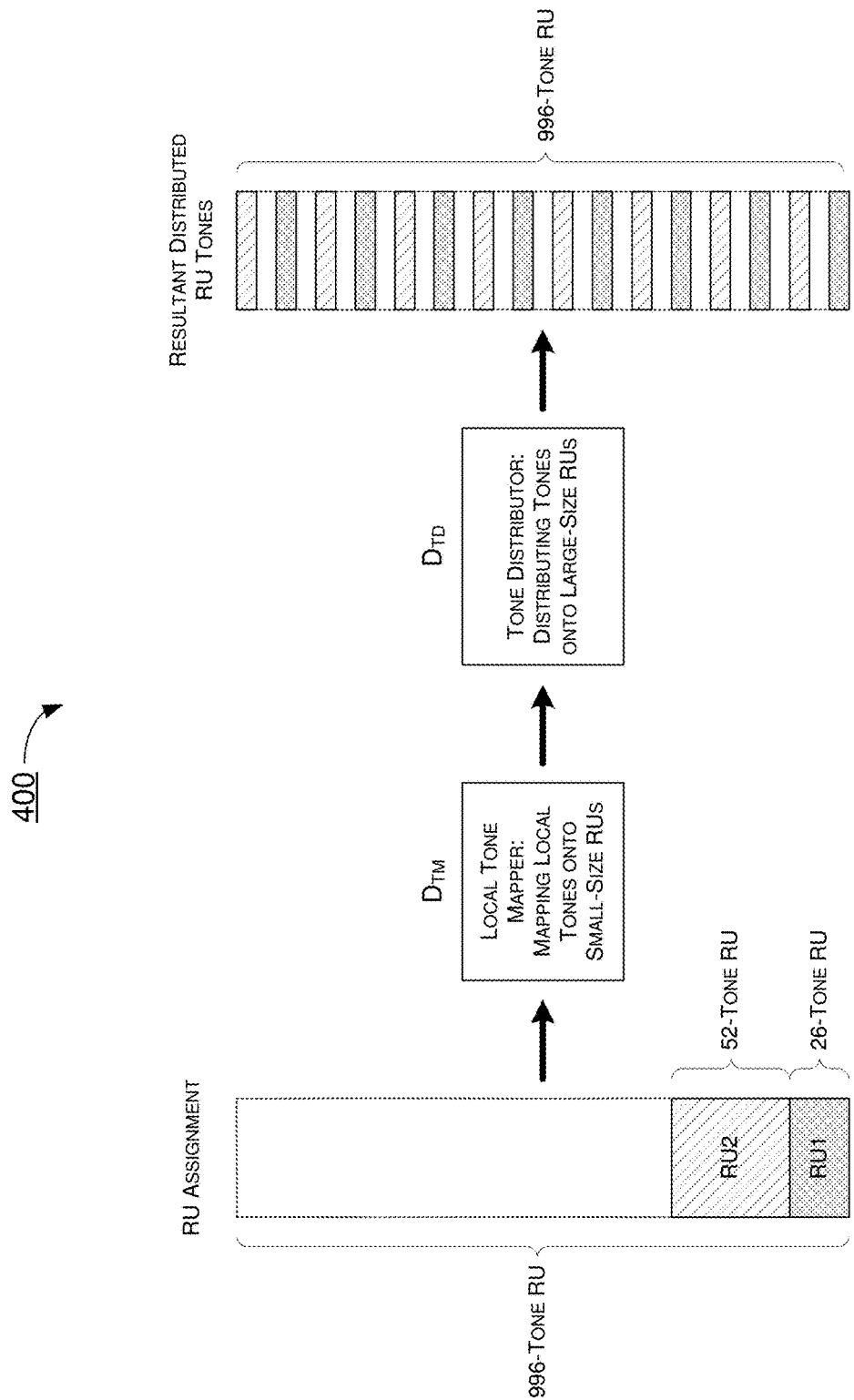
FIG. 4 is a diagram of an example scenario in accordance with an implementation of the present disclosure.

FIG. 4 illustrates an example scenario 400 of DT-RU generation under a proposed scheme in accordance with the present disclosure. Under the proposed scheme, DT-RUs may be utilized for the payload of a LPI LR PPDU. The DT-RUs may be generated by applying a large-size tone distributor on the assigned RU(s). Referring to FIG. 4, a 26-tone RU (shown as "RU1" in FIG. 4) and a 52-tone RU (shown as "RU2" in FIG. 4) may be distributed onto a 996-tone RU. For instance, a local tone mapper ($D_{TM}$) may be utilized to map tones onto small-size RU(s) and a tone distributor ($D_{TD}$) may be utilized to distribute tones of the small-size RU(s) onto large-size RU(s) (e.g., a 996-tone RU).

FIG. 5 illustrates an example scenario 500 of DT-RU generation under a proposed scheme in accordance with the present disclosure. Under the proposed scheme, a small-size RU may be mapped onto different large-size RUs using a large-size tone distributor DTD. For example, a 26-tone RU may be mapped onto a 242-tone RU using a tone distributor DTD=8. As another example, a 26-tone RU may be mapped onto a 996-tone RU using a tone distributor DTD=32. To optimize the distribution, tone spacing between every two adjacent tones in the large-size RUs may be larger than 2 MHz. For illustrative purposes and without limiting the scope of the present disclosure, possible DTD parameters for large-size RUs are listed/shown in FIG. 5. It is noteworthy that, in the table shown in FIG. 5, DTD=1 means no tone distribution. Moreover, option 1 indicated in the table refers to "per-996 distribution" and option 2 indicated in the table refers to "global distribution over 2×996".

Under a proposed scheme in accordance with the present disclosure, LPI LR-STF and LPI LR-LTF may match the format for LR payload schemes. Under the proposed scheme, in case DT-RU is applied to the payload, then LPI LR-STF and LPI LR-LTF may contain the distributed tones corresponding to the DT-RU used in the payload. Moreover, in case low rate full-BW transmission scheme for payload is used, then LPI LR-STF and LPI LR-LTF may include either duplicated 20-MHz STF and LFT or, alternatively, wide BW STF and LTF.

FIG. 6 illustrates an example design 600 of LPI LR PPDU under a proposed scheme in accordance with the present disclosure. Under the proposed scheme, a 20-MHz PPDU may be duplicated over a wider BW. For instance, a 20-MHz legacy preamble, a universal signal field (U-SIG), an extreme-high-throughput signal field (EHT-SIG), an EHT short training field (EHT-STF), an EHT long training field (EHT-LTF) and an EHT payload may be duplicated. It is noteworthy that the EHT-SIG for a LPI LR PPDU may have a 1111 structure in each 80-MHz band. Under the proposed scheme, one or more bits in the U-SIG or EHT-SIG may be utilized to indicate that this is a 20-MHz-duplicate format LPI LR PPDU. Under the proposed scheme, for reception, 80-MHz packet detection and maximum ratio combining (MRC) over four 20-MHz subchannels may be performed on the U-SIG, EHT-SIG and EHT payload. For 80-MHz band, 6 dB extra range may be obtained compared to a 20-MHz PPDU.

Figure 7:
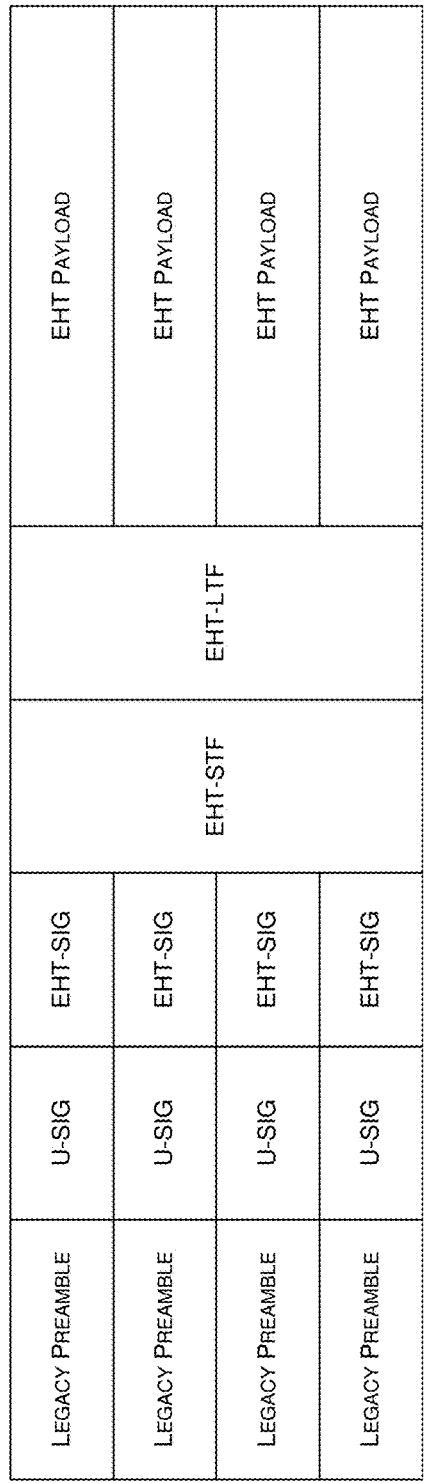
FIG. 7 is a diagram of an example design in accordance with an implementation of the present disclosure.

FIG. 7 illustrates an example design 700 of LPI LR PPDU under a proposed scheme in accordance with the present disclosure. Under the proposed scheme, a 20-MHz legacy preamble, U-SIG, EHT-SIG and EHT payload may be duplicated. It is noteworthy that the EHT-SIG for a LPI LR PPDU may have a 1111 structure in each 80-MHz band. Under the proposed scheme, for the EHT-STF and EHT-LTF, large BW EHT-STF and EHT-LTF may be utilized. For instance, a 80-MHz LPI LR PPDU may utilize 80-MHz EHT-STF and EHT-LTF. Under the proposed scheme, for reception, 80-MHz packet detection and MRC over four 20-MHz subchannels may be performed on the U-SIG, EHT-SIG and EHT payload. For 80-MHz band, 6 dB extra range may be obtained compared to a 20-MHz PPDU.

Figure 8:
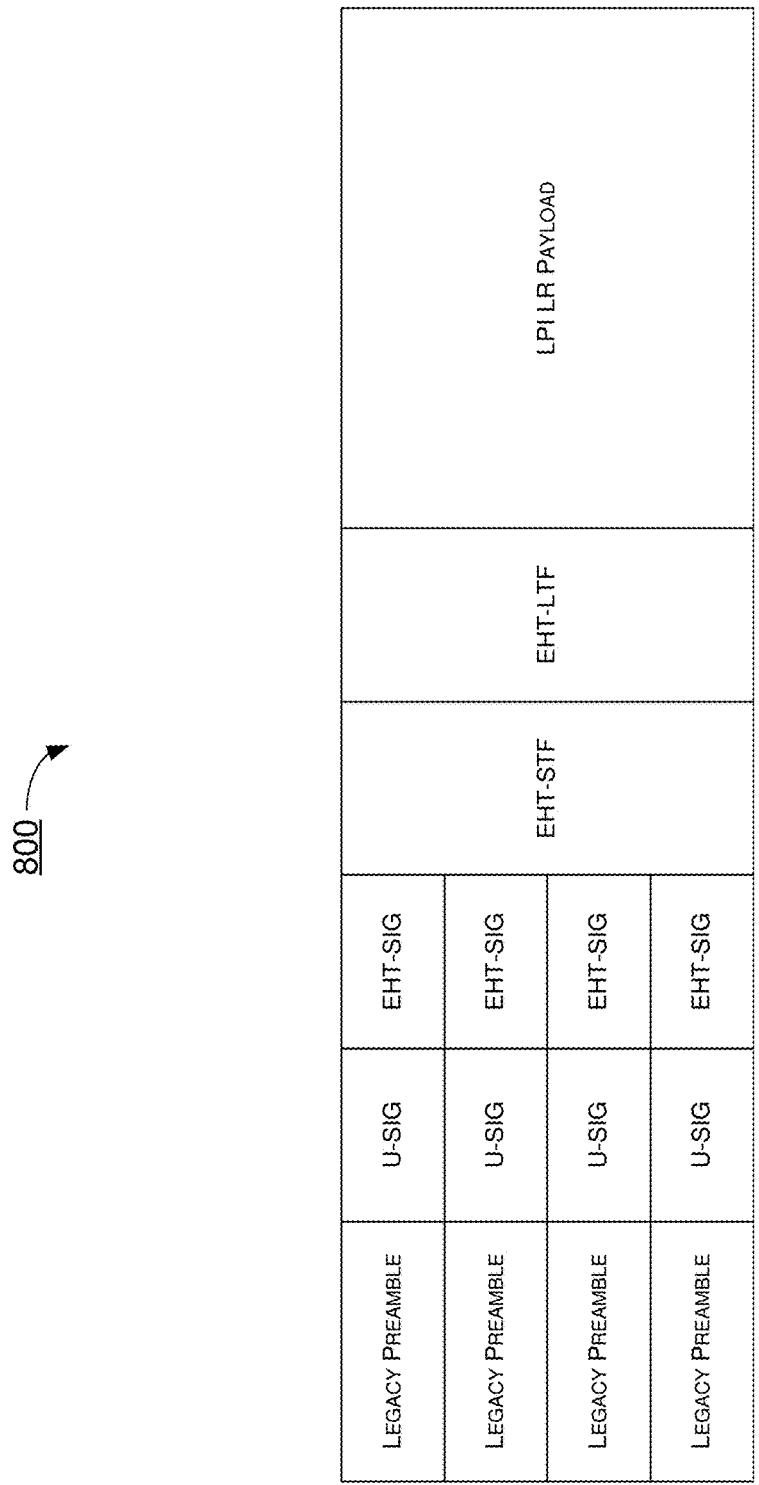
FIG. 8 is a diagram of an example design in accordance with an implementation of the present disclosure.

FIG. 8 illustrates an example design 800 of LPI LR PPDU under a proposed scheme in accordance with the present disclosure. Under the proposed scheme, a 20-MHz legacy preamble, U-SIG and EHT-SIG may be duplicated. It is noteworthy that the EHT-SIG for a LPI LR PPDU may have a 1111 structure in each 80-MHz, 160-MHz or 320-MHz band. Under the proposed scheme, for the EHT-STF and EHT-LTF, large BW EHT-STF and EHT-LTF may be utilized. For instance, a 80-MHz LPI LR PPDU may utilize 80-MHz EHT-STF and EHT-LTF. Under the proposed scheme, an EHT payload may utilize large BW with low-rate full-BW transmission schemes described herein. Under the proposed scheme, for reception, 80-MHz packet detection and MRC over four 20-MHz subchannels may be performed on the U-SIG and EHT-SIG. For 80-MHz band, 6 dB extra range may be obtained compared to a 20-MHz PPDU.

Figure 9:
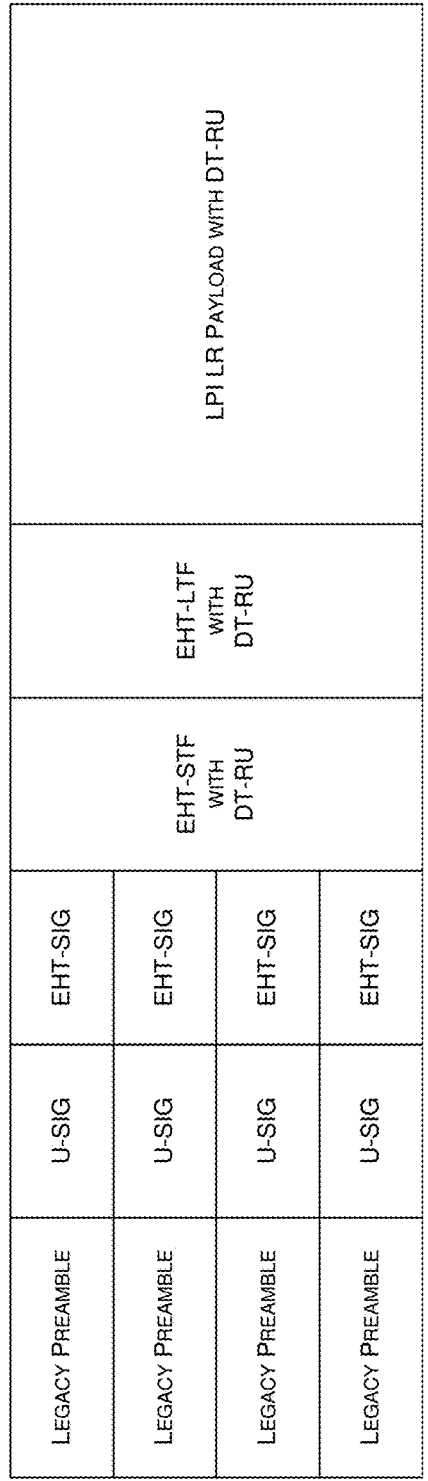
FIG. 9 is a diagram of an example design in accordance with an implementation of the present disclosure.

FIG. 9 illustrates an example design 900 of LPI LR PPDU under a proposed scheme in accordance with the present disclosure. Under the proposed scheme, a 20-MHz legacy preamble, U-SIG and EHT-SIG may be duplicated. It is noteworthy that the EHT-SIG for a LPI LR PPDU may have a 1111 structure in each 80-MHz band. Under the proposed scheme, an EHT-STF corresponding to DT-RU and an EHT-LTF corresponding to DT-RU may be selected from wide BW EHT-STF and EHT-LTF, respectively. DT-RU payload may be generated using DT-RU generation schemes described herein. Under the proposed scheme, for reception, 80-MHz packet detection and MRC over four 20-MHz subchannels may be performed on the U-SIG and EHT-SIG.

Illustrative Implementations

Figure 10:
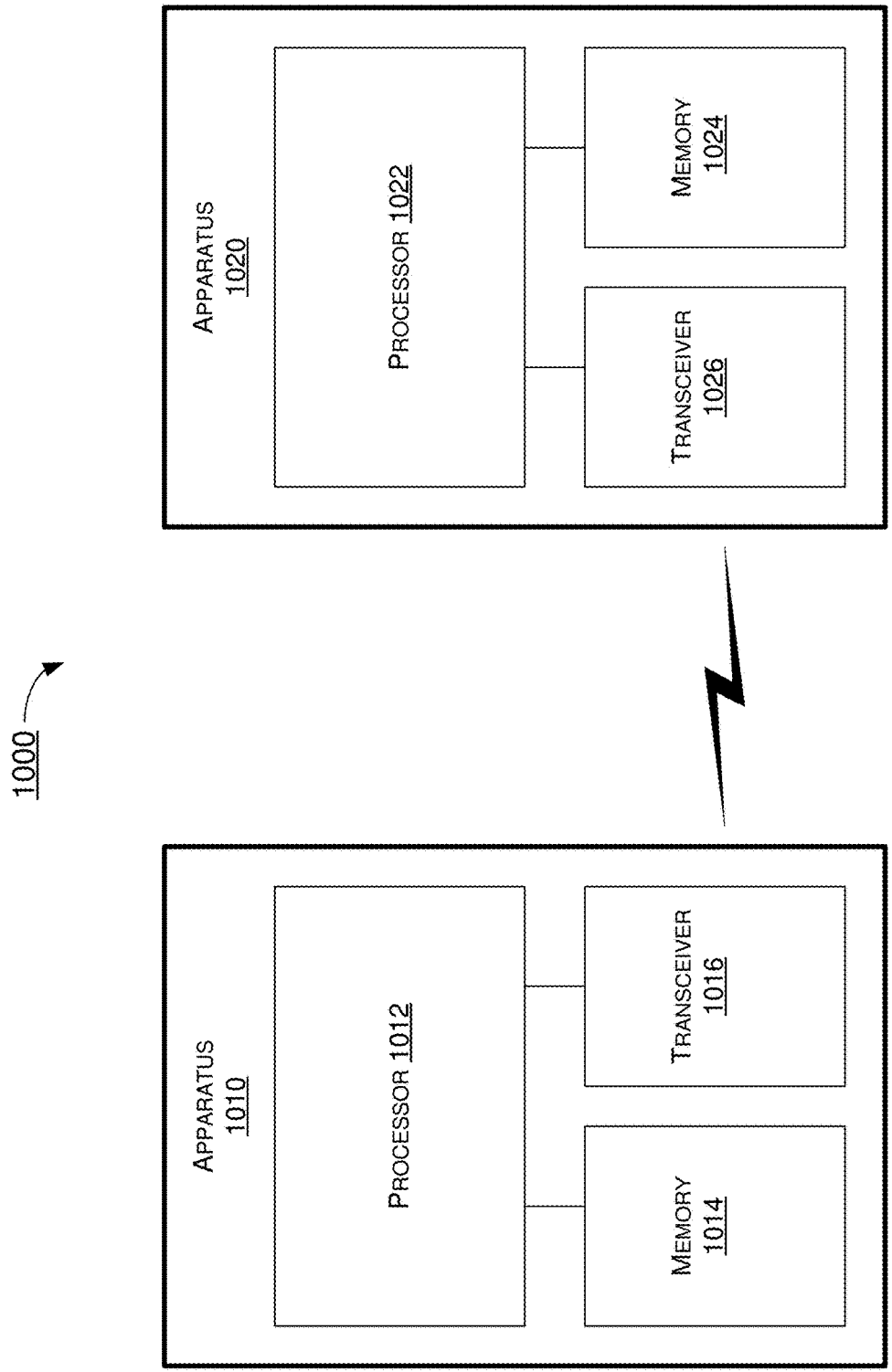
FIG. 10 is a block diagram of an example communication system in accordance with an implementation of the present disclosure.

FIG. 10 illustrates an example system 1000 having at least an example apparatus 1010 and an example apparatus 1020 in accordance with an implementation of the present disclosure. Each of apparatus 1010 and apparatus 1020 may perform various functions to implement schemes, techniques, processes and methods described herein pertaining to long-range transmission and reception for low-power indoor applications in 6-GHz band in WLANs, including the various schemes described above with respect to various proposed designs, concepts, schemes, systems and methods described above as well as processes described below. For instance, apparatus 1010 may be an example implementation of communication entity 110, and apparatus 1020 may be an example implementation of communication entity 120.

Each of apparatus 1010 and apparatus 1020 may be a part of an electronic apparatus, which may be a STA or an AP, such as a portable or mobile apparatus, a wearable apparatus, a wireless communication apparatus or a computing apparatus. For instance, each of apparatus 1010 and apparatus 1020 may be implemented in a smartphone, a smart watch, a personal digital assistant, a digital camera, or a computing equipment such as a tablet computer, a laptop computer or a notebook computer. Each of apparatus 1010 and apparatus 1020 may also be a part of a machine type apparatus, which may be an IoT apparatus such as an immobile or a stationary apparatus, a home apparatus, a wire communication apparatus or a computing apparatus. For instance, each of apparatus 1010 and apparatus 1020 may be implemented in a smart thermostat, a smart fridge, a smart door lock, a wireless speaker or a home control center. When implemented in or as a network apparatus, apparatus 1010 and/or apparatus 1020 may be implemented in a network node, such as an AP in a WLAN.

In some implementations, each of apparatus 1010 and apparatus 1020 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. In the various schemes described above, each of apparatus 1010 and apparatus 1020 may be implemented in or as a STA or an AP. Each of apparatus 1010 and apparatus 1020 may include at least some of those components shown in FIG. 10 such as a processor 1012 and a processor 1022, respectively, for example. Each of apparatus 1010 and apparatus 1020 may further include one or more other components not pertinent to the proposed scheme of the present disclosure (e.g., internal power supply, display device and/or user interface device), and, thus, such component(s) of apparatus 1010 and apparatus 1020 are neither shown in FIG. 10 nor described below in the interest of simplicity and brevity.

In one aspect, each of processor 1012 and processor 1022 may be implemented in the form of one or more single-core processors, one or more multi-core processors, one or more RISC processors or one or more CISC processors. That is, even though a singular term "a processor" is used herein to refer to processor 1012 and processor 1022, each of processor 1012 and processor 1022 may include multiple processors in some implementations and a single processor in other implementations in accordance with the present disclosure. In another aspect, each of processor 1012 and processor 1022 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 1012 and processor 1022 is a special-purpose machine specifically designed, arranged and configured to perform specific tasks including those pertaining to long-range transmission and reception for low-power indoor applications in 6-GHz band in WLANs in accordance with various implementations of the present disclosure. For instance, each of processor 1012 and processor 1022 may be configured with hardware components, or circuitry, implementing one, some or all of the examples described and illustrated herein.

In some implementations, apparatus 1010 may also include a transceiver 1016 coupled to processor 1012. Transceiver 1016 may be capable of wirelessly transmitting and receiving data. In some implementations, apparatus 1020 may also include a transceiver 1026 coupled to processor 1022. Transceiver 1026 may include a transceiver capable of wirelessly transmitting and receiving data.

In some implementations, apparatus 1010 may further include a memory 1014 coupled to processor 1012 and capable of being accessed by processor 1012 and storing data therein. In some implementations, apparatus 1020 may further include a memory 1024 coupled to processor 1022 and capable of being accessed by processor 1022 and storing data therein. Each of memory 1014 and memory 1024 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 1014 and memory 1024 may include a type of read-only memory (ROM) such as mask ROM, programmable ROM (PROM), erasable programmable ROM (EPROM) and/or electrically erasable programmable ROM (EEPROM). Alternatively, or additionally, each of memory 1014 and memory 1024 may include a type of non-volatile random-access memory (NVRAM) such as flash memory, solid-state memory, ferroelectric RAM (FeRAM), magnetoresistive RAM (MRAM) and/or phase-change memory.

Each of apparatus 1010 and apparatus 1020 may be a communication entity capable of communicating with each other using various proposed schemes in accordance with the present disclosure. For illustrative purposes and without limitation, a description of capabilities of apparatus 1010, as communication entity 110, and apparatus 1020, as communication entity 120, is provided below. It is noteworthy that, although the example implementations described below are provided in the context of WLAN, the same may be implemented in other types of networks. Thus, although the following description of example implementations pertains to a scenario in which apparatus 1010 functions as a transmitting device and apparatus 1020 functions as a receiving device, the same is also applicable to another scenario in which apparatus 1010 functions as a receiving device and apparatus 1020 functions as a transmitting device.

Under a proposed scheme in accordance with the present disclosure with respect to long-range transmission and reception for low-power indoor applications in 6-GHz band in WLANs, processor 1012 of apparatus 1010 may establish, via the transceiver, a wireless communication link between a first STA (e.g., apparatus 1010) and a second STA (e.g., apparatus 1020) in a 6-GHz band. Additionally, processor 1012 may communicate, via transceiver 1016, between the first STA and the second STA (e.g., transmit or receive) in the 6-GHz band using a LPI LR PPDU. For instance, processor 1012 of apparatus 1010 may generate the LPI LR PPDU and transmit the LPI LR PPDU, via transceiver 1016, to apparatus 1020. Correspondingly, processor 1022 of apparatus 1020 may receive the LPI LR PPDU, via transceiver 1026, and decode/process the LPI LR PPDU.

In some implementations, the LPI LR PPDU may include a legacy preamble, a U-SIG, an EHT-SIG, an EHT-STF, an EHT-LTF, and a payload.

In some implementations, each of the legacy preamble, U-SIG and EHT-SIG may be modulated and duplicated over multiple 20-MHz subchannels by DCM or dual DCM for a 80-MHz, 160-MHz or 320-MHz bandwidth over which the LPI LR PPDU is transmitted. Moreover, each of the EHT-STF, EHT-LTF and payload is modulated and transmitted on an entirety of the 80-MHz, 160-MHz or 320-MHz bandwidth. In some implementations, each of the EHT-STF, EHT-LTF and payload may be transmitted with DT-RUs by: (i) mapping each local tone of the payload onto small-size RUs of less than 242 tones; and (ii) distributing tones in the small-size RUs onto large-size RUs of 242 or more tones. In such cases, the LPI LR-STF and LPI LR-LTF may contain distributed tones corresponding to the DT-RUs used in the payload.

Alternatively, each of the legacy preamble, U-SIG, EHT-SIG, EHT-STF, EHT-LTF and payload may be modulated and duplicated over multiple 20-MHz subchannels for a 80-MHz, 160-MHz or 320-MHz bandwidth over which the LPI LR PPDU is transmitted.

Still alternatively, each of the legacy preamble, U-SIG, EHT-SIG and payload may be modulated and duplicated over multiple 20-MHz subchannels for a 80-MHz, 160-MHz or 320-MHz bandwidth over which the LPI LR PPDU is transmitted. Moreover, each of the EHT-STF and EHT-LTF may be modulated and transmitted on an entirety of the 80-MHz, 160-MHz or 320-MHz bandwidth.

In some implementations, a preamble of the LPI LR PPDU may include a legacy preamble, one or more LPI LR-specific fields, and a payload.

In some implementations, the one or more LPI LR-specific fields may include a LPI LR-SIG containing indications on one or more of an MCS, coding, a LR PPDU format, and a repetition factor. In some implementations, the LPI LR-SIG may be modulated and encoded over 80 MHz, 160 MHz or 320 MHz either with information bits spread by a factor of 2, 4, 6 or 8 or with a subchannel containing the LPI LR-SIG repeated 2, 4, 6 or 8 times.

In some implementations, the one or more LPI LR-specific fields may include a LPI LR-STF and a LPI LR-LTF. In some implementations, in communicating in the 6-GHz band using the LPI LR PPDU, processor 1012 may communicate with DT-RUs by: (i) mapping each local tone of the payload onto small-size RUs of less than 242 tones; and (ii) distributing tones in the small-size RUs onto large-size RUs of 242 or more tones. In such cases, the LPI LR-STF and LPI LR-LTF contain distributed tones corresponding to the DT-RUs used in the payload.

In some implementations, the one or more LPI LR-specific fields may include a LPI LR-STF and a LPI LR-LTF. In some implementations, in communicating in the 6-GHz band using the LPI LR PPDU, processor 1012 may transmit or receive the LPI LR PPDU with low rate full-bandwidth for the payload. In such cases, transmission of each of the LPI LR-STF and LPI LR-LTF may involve either: (a) transmitting each of the LPI LR-STF and LPI LR-LTF over duplicated 20-MHz subchannels; or (b) transmitting each of the LPI LR-STF and LPI LR-LTF as a wide-bandwidth LPI LR-STF and LPI LR-LTF, respectively, over a 80-MHz, 160-MHz or 320-MHz bandwidth.

In some implementations, in communicating in the 6-GHz band using the LPI LR PPDU, processor 1012 may transmit or receive the LPI LR PPDU with low rate full-bandwidth transmission such that a signal carrying the LPI LR PPDU is modulated and duplicated on multiple tones that are separated.

In some implementations, in transmitting or receiving the LPI LR PPDU with low rate full-bandwidth transmission, processor 1012 may encode the signal carrying LPI LR PPDU on a 80-MHz, 160-MHz or 320-MHz bandwidth. Additionally, processor 1012 may duplicate the encoded signal on different tones.

In some implementations, in duplicating the encoded signal on different tones, processor 1012 may duplicate the encoded signal on different tones by DCM or duplicate DCM.

Alternatively, in transmitting or receiving the LPI LR PPDU with low rate full-bandwidth transmission, processor 1012 may encode the LPI LR PPDU on a 20-MHz subchannel. Moreover, processor 1012 may duplicate the encoded 20-MHz subchannel multiple times.

In some implementations, in communicating in the 6-GHz band using the LPI LR PPDU, processor 1012 may communicate with DT-RUs by: (i) mapping each local tone onto small-size RUs of less than 242 tones; and (ii) distributing tones in the small-size RUs onto large-size RUs of 242 or more tones. In some implementations, a tone spacing between every two adjacent tones in the large-size RUs may be greater than 2 MHz.

In some implementation, in communicating in the 6-GHz band using the LPI LR PPDU, on the receiving end processor 1022 may perform 80-MHz packet detection and MRC over four 20-MHz subchannels on the U-SIG and EHT-SIG of the LPI LR PPDU.

Illustrative Processes

Figure 11:
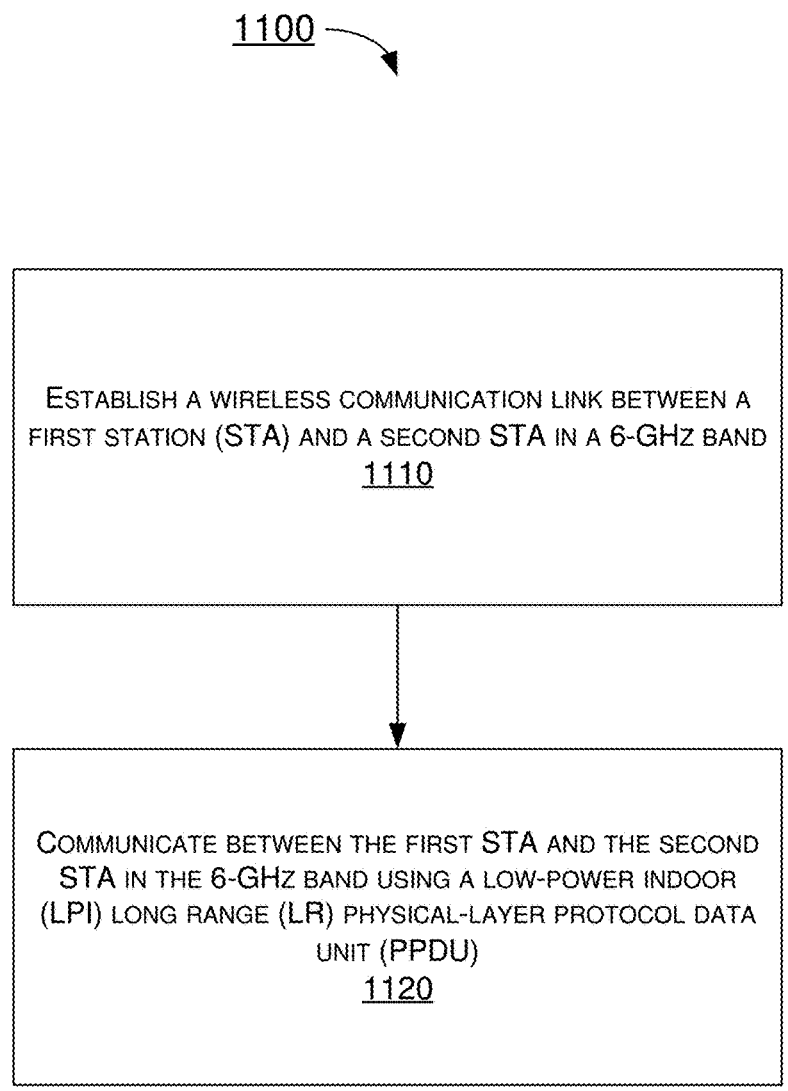
FIG. 11 is a flowchart of an example process in accordance with an implementation of the present disclosure.

FIG. 11 illustrates an example process 1100 in accordance with an implementation of the present disclosure. Process 1100 may represent an aspect of implementing various proposed designs, concepts, schemes, systems and methods described above. More specifically, process 1100 may represent an aspect of the proposed concepts and schemes pertaining to long-range transmission and reception for low-power indoor applications in 6-GHz band in WLANs in accordance with the present disclosure. Process 1100 may include one or more operations, actions, or functions as illustrated by one or more of blocks 1110 and 1120. Although illustrated as discrete blocks, various blocks of process 1100 may be divided into additional blocks, combined into fewer blocks, or eliminated, depending on the desired implementation. Moreover, the blocks/sub-blocks of process 1100 may be executed in the order shown in FIG. 11 or, alternatively in a different order. Furthermore, one or more of the blocks/sub-blocks of process 1100 may be executed repeatedly or iteratively. Process 1100 may be implemented by or in apparatus 1010 and apparatus 1020 as well as any variations thereof. Solely for illustrative purposes and without limiting the scope, process 1100 is described below in the context of apparatus 1010 as communication entity 110 (e.g., a transmitting device whether a STA or an AP) and apparatus 1020 as communication entity 120 (e.g., a receiving device whether a STA or an AP) of a wireless network such as a WLAN in accordance with one or more of IEEE 802.11 standards. Process 1100 may begin at block 1110.

At 1110, process 1100 may involve processor 1012 of apparatus 1010 establishing, via transceiver 1016, a wireless communication link between a first STA (e.g., apparatus 1010) and a second STA (e.g., apparatus 1020) in a 6-GHz band. Process 1100 may proceed from 1110 to 1120.

At 1120, process 1100 may involve processor 1012 communicating, via transceiver 1016, between the first STA and the second STA in the 6-GHz band using a LPI LR PPDU.

In some implementations, the LPI LR PPDU may include a legacy preamble, a U-SIG, an EHT-SIG, an EHT-STF, an EHT-LTF, and a payload.

In some implementations, each of the legacy preamble, U-SIG and EHT-SIG may be modulated and duplicated over multiple 20-MHz subchannels by DCM or duplicate DCM for a 80-MHz, 160-MHz or 320-MHz bandwidth over which the LPI LR PPDU is transmitted. Moreover, each of the EHT-STF, EHT-LTF and payload is modulated and transmitted on an entirety of the 80-MHz, 160-MHz or 320-MHz bandwidth. In some implementations, each of the EHT-STF, EHT-LTF and payload may be transmitted with DT-RUs by: (i) mapping each local tone of the payload onto small-size RUs of less than 242 tones; and (ii) distributing tones in the small-size RUs onto large-size RUs of 242 or more tones. In such cases, the LPI LR-STF and LPI LR-LTF may contain distributed tones corresponding to the DT-RUs used in the payload.

Alternatively, each of the legacy preamble, U-SIG, EHT-SIG, EHT-STF, EHT-LTF and payload may be modulated and duplicated over multiple 20-MHz subchannels for a 80-MHz, 160-MHz or 320-MHz bandwidth over which the LPI LR PPDU is transmitted.

Still alternatively, each of the legacy preamble, U-SIG, EHT-SIG and payload may be modulated and duplicated over multiple 20-MHz subchannels for a 80-MHz, 160-MHz or 320-MHz bandwidth over which the LPI LR PPDU is transmitted. Moreover, each of the EHT-STF and EHT-LTF may be modulated and transmitted on an entirety of the 80-MHz, 160-MHz or 320-MHz bandwidth.

In some implementations, a preamble of the LPI LR PPDU may include a legacy preamble, one or more LPI LR-specific fields, and a payload.

In some implementations, the one or more LPI LR-specific fields may include a LPI LR-SIG containing indications on one or more of an MCS, coding, a LR PPDU format, and a repetition factor. In some implementations, the LPI LR-SIG may be modulated and encoded over 80 MHz, 160 MHz or 320 MHz either with information bits spread by a factor of 2, 4, 6 or 8 or with a subchannel containing the LPI LR-SIG repeated 2, 4, 6 or 8 times.

In some implementations, the one or more LPI LR-specific fields may include a LPI LR-STF and a LPI LR-LTF. In some implementations, in communicating in the 6-GHz band using the LPI LR PPDU, process 1100 may involve processor 1012 communicating with DT-RUs by: (i) mapping each local tone of the payload onto small-size RUs of less than 242 tones; and (ii) distributing tones in the small-size RUs onto large-size RUs of 242 or more tones. In such cases, the LPI LR-STF and LPI LR-LTF contain distributed tones corresponding to the DT-RUs used in the payload.

In some implementations, the one or more LPI LR-specific fields may include a LPI LR-STF and a LPI LR-LTF. In some implementations, in communicating in the 6-GHz band using the LPI LR PPDU, process 1100 may involve processor 1012 transmitting or receiving the LPI LR PPDU with low rate full-bandwidth for the payload. In such cases, transmission of each of the LPI LR-STF and LPI LR-LTF may involve either: (a) transmitting each of the LPI LR-STF and LPI LR-LTF over duplicated 20-MHz subchannels; or (b) transmitting each of the LPI LR-STF and LPI LR-LTF as a wide-bandwidth LPI LR-STF and LPI LR-LTF, respectively, over a 80-MHz, 160-MHz or 320-MHz bandwidth.

In some implementations, in communicating in the 6-GHz band using the LPI LR PPDU, process 1100 may involve processor 1012 transmitting or receiving the LPI LR PPDU with low rate full-bandwidth transmission such that a signal carrying the LPI LR PPDU is modulated and duplicated on multiple tones that are separated.

In some implementations, in transmitting or receiving the LPI LR PPDU with low rate full-bandwidth transmission, process 1100 may involve processor 1012 encoding the signal carrying LPI LR PPDU on a 80-MHz, 160-MHz or 320-MHz bandwidth. Additionally, process 1100 may involve processor 1012 duplicating the encoded signal on different tones.

In some implementations, in duplicating the encoded signal on different tones, process 1100 may involve processor 1012 duplicating the encoded signal on different tones by DCM or duplicate DCM.

Alternatively, in transmitting or receiving the LPI LR PPDU with low rate full-bandwidth transmission, process 1100 may involve processor 1012 encoding the LPI LR PPDU on a 20-MHz subchannel. Moreover, process 1100 may involve processor 1012 duplicating the encoded 20-MHz subchannel multiple times.

In some implementations, in communicating in the 6-GHz band using the LPI LR PPDU, process 1100 may involve processor 1012 communicating with DT-RUs by: (i) mapping each local tone onto small-size RUs of less than 242 tones; and (ii) distributing tones in the small-size RUs onto large-size RUs of 242 or more tones. In some implementations, a tone spacing between every two adjacent tones in the large-size RUs may be greater than 2 MHz.

In some implementation, in communicating in the 6-GHz band using the LPI LR PPDU, on the receiving end process 1100 may involve processor 1022 performing 80-MHz packet detection and MRC over four 20-MHz subchannels on the U-SIG and EHT-SIG of the LPI LR PPDU.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   establishing a wireless communication link between a first station (STA) and a second STA in a 6-GHz band; and
   communicating between the first STA and the second STA in the 6-GHz band using a low-power indoor (LPI) long range (LR) physical-layer protocol data unit (PPDU),
   wherein the LPI LR PPDU comprises a legacy preamble, a universal signal field (U-SIG), an extreme-high-throughput signal field (EHT-SIG), an extreme-high-throughput short training field (EHT-STF), an extreme-high-throughput long training field (EHT-LTF), and a payload,
   wherein each of the legacy preamble, U-SIG and EHT-SIG is modulated over one 20-MHz subchannel and duplicated across multiple 20-MHz subchannels in a 80-MHz, 160-MHz or 320-MHz bandwidth over which the LPI LR PPDU is transmitted, and
   wherein each of the EHT-STF, EHT-LTF and payload is modulated over an entirety of the 80-MHz, 160-MHz or 320-MHz bandwidth and transmitted on the entirety of the 80-MHz, 160-MHz or 320-MHz bandwidth.

2. The method of claim 1, wherein each of the legacy preamble, U-SIG and EHT-SIG is duplicated over the multiple 20-MHz subchannels by dual carrier modulation (DCM) or duplicate DCM, and wherein each of the EHT-STF, EHT-LTF and payload is transmitted with distributed-tone resource units (DT-RUs) by:
   mapping each local tone of the payload onto small-size RUs of less than 242 tones; and
   distributing tones in the small-size RUs onto large-size RUs of 242 or more tones,
   wherein the LPI LR-STF and LPI LR-LTF contain distributed tones corresponding to the DT-RUs used in the payload.

3. The method of claim 1, wherein each of the legacy preamble, U-SIG, EHT-SIG, EHT-STF, EHT-LTF and payload is modulated and duplicated over multiple 20-MHz subchannels for a 80-MHz, 160-MHz or 320-MHz bandwidth over which the LPI LR PPDU is transmitted.

4. The method of claim 1, wherein each of the legacy preamble, U-SIG, EHT-SIG and payload is modulated and duplicated over multiple 20-MHz subchannels for a 80-MHz, 160-MHz or 320-MHz bandwidth over which the LPI LR PPDU is transmitted, and wherein each of the EHT-STF and EHT-LTF is modulated and transmitted on an entirety of the 80-MHz, 160-MHz or 320-MHz bandwidth.

5. The method of claim 1, wherein a preamble of the LPI LR PPDU comprises a legacy preamble, one or more LPI LR-specific fields, and a payload.

6. The method of claim 5, wherein the one or more LPI LR-specific fields comprises a LPI LR signal field (LPI LR-SIG) containing indications on one or more of a modulation and coding scheme (MCS), coding, a LR PPDU format, and a repetition factor.

7. The method of claim 6, wherein the LPI LR-SIG is modulated and encoded over 80 MHz, 160 MHz or 320 MHz either with information bits spread by a factor of 2, 4, 6 or 8 or with a subchannel containing the LPI LR-SIG repeated 2, 4, 6 or 8 times.

8. The method of claim 5, wherein the one or more LPI LR-specific fields comprises a LPI LR short training field (LPI LR-STF) and a LPI LR long training field (LPI LR-LTF), and wherein the communicating in the 6-GHz band using the LPI LR PPDU comprises communicating with distributed-tone resource units (DT-RUs) by:
mapping each local tone of the payload onto small-size RUs of less than 242 tones; and
distributing tones in the small-size RUs onto large-size RUs of 242 or more tones,
wherein the LPI LR-STF and LPI LR-LTF contain distributed tones corresponding to the DT-RUs used in the payload.

9. The method of claim 5, wherein the one or more LPI LR-specific fields comprises a LPI LR short training field (LPI LR-STF) and a LPI LR long training field (LPI LR-LTF), wherein the communicating in the 6-GHz band using the LPI LR PPDU comprises transmitting or receiving the LPI LR PPDU with a low rate full-bandwidth for the payload, and wherein transmission of each of the LPI LR-STF and LPI LR-LTF comprises:
transmitting each of the LPI LR-STF and LPI LR-LTF over duplicated 20-MHz subchannels; or
transmitting each of the LPI LR-STF and LPI LR-LTF as a wide-bandwidth LPI LR-STF and LPI LR-LTF, respectively, over a 80-MHz, 160-MHz or 320-MHz bandwidth.

10. The method of claim 1, wherein the communicating in the 6-GHz band using the LPI LR PPDU comprises transmitting or receiving the LPI LR PPDU with a low rate full-bandwidth transmission such that a signal carrying the LPI LR PPDU is modulated and duplicated on multiple tones that are separated.

11. The method of claim 10, wherein the transmitting or receiving of the LPI LR PPDU with the low rate full-bandwidth transmission comprises:
encoding the signal carrying LPI LR PPDU on a 80-MHz, 160-MHz or 320-MHz bandwidth; and
duplicating the encoded signal on different tones.

12. The method of claim 11, wherein the duplicating of the encoded signal on different tones comprises duplicating the encoded signal on different tones by dual carrier modulation (DCM) or duplicate DCM.

13. The method of claim 10, wherein the transmitting or receiving of the LPI LR PPDU with the low rate full-bandwidth transmission comprises:
encoding the LPI LR PPDU on a 20-MHz subchannel; and
duplicating the encoded 20-MHz subchannel multiple times.

14. The method of claim 1, wherein the communicating in the 6-GHz band using the LPI LR PPDU comprises communicating with distributed-tone resource units (DT-RUs) by:
mapping each local tone onto small-size RUs of less than 242 tones; and
distributing tones in the small-size RUs onto large-size RUs of 242 or more tones,
wherein a tone spacing between every two adjacent tones in the large-size RUs is greater than 2 MHz.

15. The method of claim 1, wherein the communicating in the 6-GHz band using the LPI LR PPDU comprises performing 80-MHz packet detection and maximum ratio combining (MRC) over four 20-MHz subchannels on the U-SIG and the EHT-SIG of the LPI LR PPDU.

16. An apparatus, comprising:
a transceiver configured to communicate wirelessly; and
a processor coupled to the transceiver and configured to perform operations comprising:
establishing, via the transceiver, a wireless communication link between a first station (STA) and a second STA in a 6-GHz band; and
communicating, via the transceiver, between the first STA and the second STA in the 6-GHz band using a low-power indoor (LPI) long range (LR) physical-layer protocol data unit (PPDU),
wherein the LPI LR PPDU comprises a legacy preamble, a universal signal field (U-SIG), an extreme-high-throughput signal field (EHT-SIG), an extreme-high-throughput short training field (EHT-STF), an extreme-high-throughput long training field (EHT-LTF), and a payload,
wherein each of the legacy preamble, U-SIG and EHT-SIG is modulated over one 20-MHz subchannel and duplicated across multiple 20-MHz subchannels in a 80-MHz, 160-MHz or 320-MHz bandwidth over which the LPI LR PPDU is transmitted, and
wherein each of the EHT-STF, EHT-LTF and payload is modulated over an entirety of the 80-MHz, 160-MHz or 320-MHz bandwidth and transmitted on the entirety of the 80-MHz, 160-MHz or 320-MHz bandwidth.

17. The apparatus of claim 16, wherein, in communicating in the 6-GHz band using a LPI LR PPDU, the processor is configured to perform operations comprising:
modulating and duplicating each of the legacy preamble, U-SIG and EHT-SIG over multiple 20-MHz subchannels by dual carrier modulation (DCM) or duplicate DCM for a 80-MHz, 160-MHz or 320-MHz bandwidth over which the LPI LR PPDU is transmitted; and
modulating and transmitting each of the EHT-STF, EHT-LTF and payload on an entirety of the 80-MHz, 160-MHz or 320-MHz bandwidth.

* * * * *